Dec. 13, 1927.  1,652,525

W. HAHNEMANN ET AL

METHOD OF TESTING MATERIALS

Filed Jan. 29, 1923

Inventors
Walter Hahnemann, and
Heinrich Hecht
by Knight Bros
attorneys

Patented Dec. 13, 1927.

1,652,525

UNITED STATES PATENT OFFICE.

WALTER HAHNEMANN, OF KITZEBERG, NEAR KIEL, AND HEINRICH HECHT, OF KIEL, GERMANY, ASSIGNORS TO SIGNAL GESELLSCHAFT MIT BESCHRÄNKTER HAFTUNG, OF KIEL, GERMANY.

METHOD OF TESTING MATERIALS.

Application filed January 29, 1923, Serial No. 615,684, and in Germany January 30, 1922.

The invention relates to a method of testing materials, such for example as that explained in application Ser. No. 494,575, which consists in subjecting a test-piece of the material to be tested to alternating stresses, the test-piece being an elastic portion of a vibratory structure and the vibratory structure vibrating in its natural frequency.

The invention has the object to enable the observer to find for test-pieces of different material and different shape in a convenient way and in short time of observation the values for calculating the elastic properties of the material under test.

The invention combines with the before mentioned method of subjecting the test-piece to alternating loads or stresses an observation in connection with the temperature of the test-piece.

Figure 1:
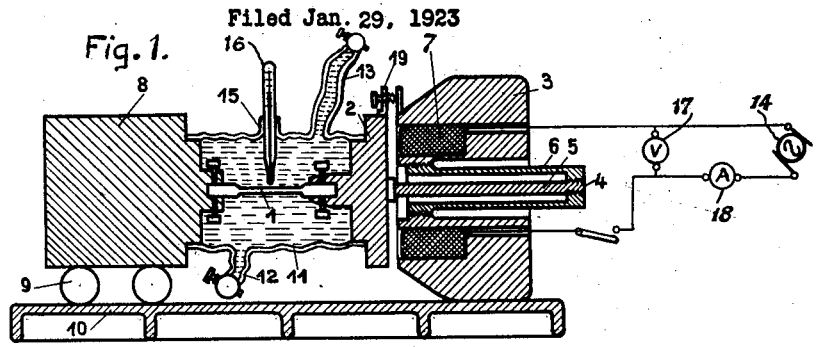
Figure 2:
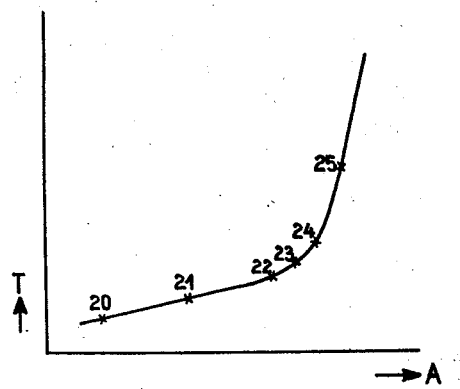

Other particular features of the invention may be explained in connection with the drawings in which:

Fig. 1 shows an arrangement for testing materials according to the invention, and Fig. 2 a curve of the different temperatures of the test-piece depending upon varying amplitudes of the vibratory structures.

In Fig. 1 the test-piece is represented by the rod 1, inserted between a large and heavy mass 8 and the smaller mass 2 of a vibratory structure comprising besides another larger mass 3 and an elastic member 4. The latter consists of an elastic rod 5 concentrically situated within an elastic tube 6, the rod being connected to the smaller mass 2 and to the free end of the tube 6, the other of which is connected to the larger mass 3. The smaller mass 2 is formed as armature of an electro-magnetic system the field of which is represented by the larger mass 3 of the vibratory structure together with an exciting coil 7 fed by the alternating current of the alternating current generator 14. The large and heavy mass 8 is mounted upon rolls or balls 9 for the purpose to enable the test-piece to expand on becoming heated without being bent.

The test-piece 1 is surrounded by a bag 11 preferably of yielding material such as rubber or the like and containing a fluid as for instance air, water or oil. Two feeding leadings 12 and 13 are connected to the bag 11 and an opening 15 serves for the purpose to introduce a thermometer 16. The fluid in the bag 11 may be caused to flow; it serves for cooling the test-piece and for enabling the operator to hold constant the temperature of the test-piece during observing. Measuring instruments 17, 18 in the electrical circuit and a micrometer screw 19 connected to the masses of the vibratory structure enable the operator to observe the feeding current, the load applied to the test-piece and the amplitude of motion of the mass 2 of the vibratory structure, i. e. the amplitude to which the test-piece is subjected.

Fig. 2 shows a diagram of the temperature T of the test-piece if the test-piece is subjected to stresses and pressures of different amplitudes A. The temperature is observed as follows: The liquid surrounding the test-piece is prevented from flowing. Then the electromagnet is excited to a definite amplitude and the operator observes the thermometer until the temperature of the test-piece and the bath of liquid becomes constant. Then the amplitude is enhanced and the same observation is repeated. In this way points 20 to 24 inclusive of the diagram are found. Finally the point 25 is obtained at which the temperature rises very rapidly and no longer attains a constant value but continues to rise until rupture of the test piece occurs. When the point 25 is found, the observer knows that the load limit for the material under test has been reached.

The temperature may be measured in any other manner well known to persons skilled in the art, for instance, electrically by means of a thermoelectric couple.

We claim:

1. A method of testing materials comprising employing a test-piece as an elastic portion of a vibratory structure formed of two elastically connected masses; causing the said vibratory structure to vibrate in its natural frequency, and observing the temperature developed in the test-piece by such vibration.

2. A method of testing materials comprising employing a test-piece as an elastic portion of a vibratory structure formed of two elastically connected masses; causing the said vibratory structure to vibrate in its natural frequency and at different amplitudes, and observing the temperature developed in the test-piece at each amplitude when the temperature attains a constant value.

3. A method of testing materials comprising employing a test piece as an elastic portion of a vibratory structure formed of two elastically connected masses, causing said vibratory structure to vibrate in its natural frequency, varying the amplitude of the vibrations, and observing the temperature developed in the test piece at each amplitude by such vibrations.

4. A method of testing materials, comprising employing a test piece as an elastic portion of a vibratory structure formed of two elastically connected masses, causing said vibratory structure to vibrate in its natural frequency at a certain amplitude, increasing the amplitude, and observing the effect of the increase in amplitude on the temperature of the test piece.

5. In apparatus for testing materials, a vibratory structure formed of two elastically connected masses having a test piece forming an elastic portion thereof, means for causing said vibratory structure to vibrate in its natural frequency, means for varying the amplitude of the vibrations, and means for observing the temperatures developed in the test piece by said vibrations.

6. A method of testing materials, comprising employing a test piece as an elastic portion of a vibratory structure formed of two elastically connected masses, causing said vibratory structure to vibrate in its natural frequency at a certain amplitude, observing the ultimate constant temperature attained by the test piece at said amplitude, and increasing the amplitude and observing the ultimate constant temperature attained at each increased amplitude until the point of rupture is approached where the temperature does not attain a constant value but rises rapidly.

7. A method of testing materials, comprising employing a test piece as an elastic portion of a vibratory structure formed of two elastically connected masses, maintaining said test piece submerged in a liquid, causing said vibratory structure to vibrate in its natural frequency at a certain amplitude, observing the ultimate constant temperature attained by the test piece at said amplitude, and increasing the amplitude and observing the ultimate constant temperature attained by the test piece at each increased amplitude until the point of rupture is approached where the temperature does not attain a constant value but rises rapidly.

8. In apparatus for testing materials, a vibratory structure formed of two elastically connected masses having a test piece forming an elastic portion thereof, means for maintaining said test piece submerged in a liquid, means for causing said vibratory structure to vibrate in its natural frequency, means for varying the amplitude of the vibrations, and means for observing the temperatures developed in the test piece by said vibrations.

In testimony whereof we affix our signatures.

WALTER HAHNEMANN.
HEINRICH HECHT.